(No Model.)
G. WILKIN.
BERRY HARVESTER.
No. 382,745. Patented May 15, 1888.
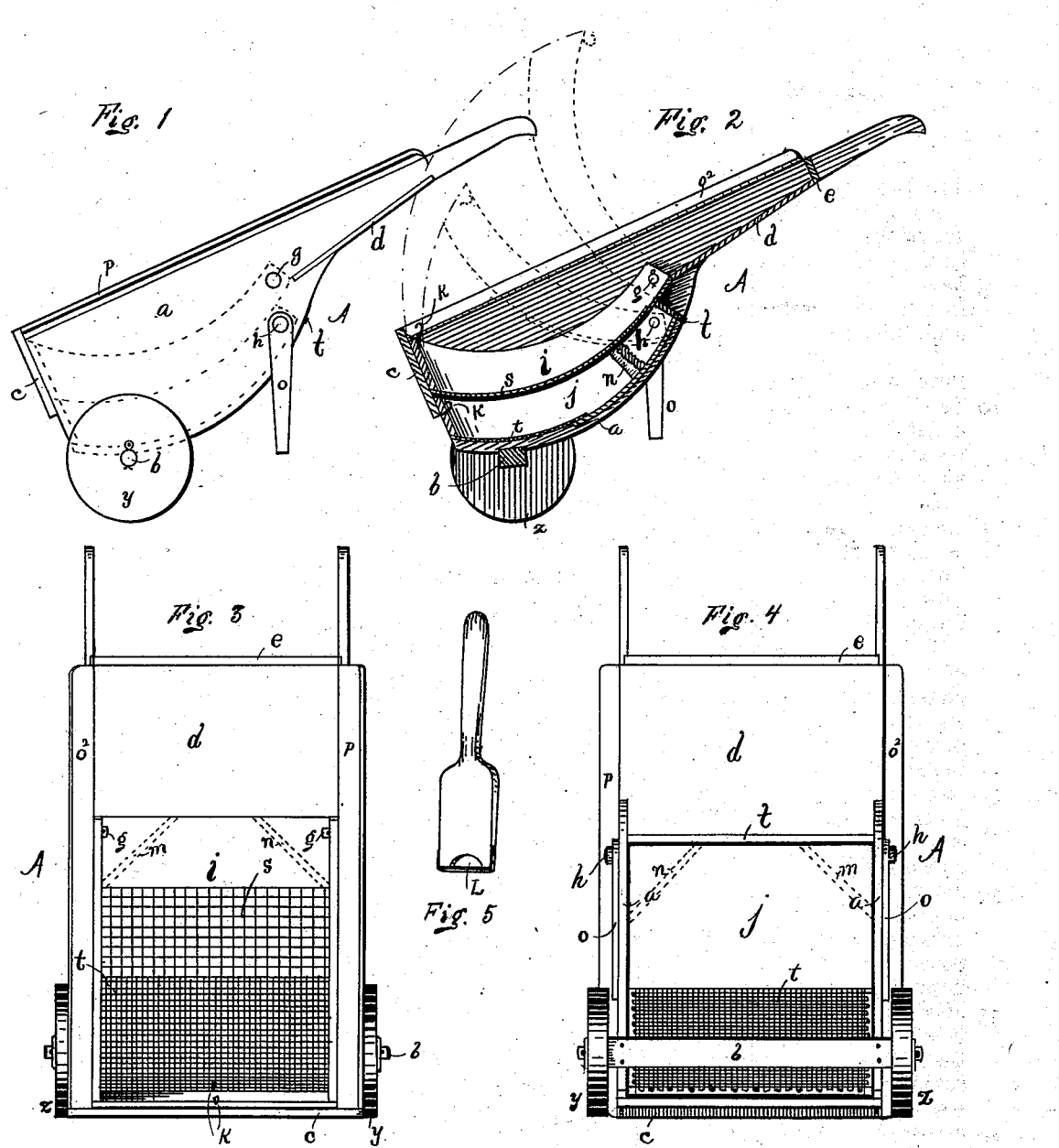
Witnesses.
Emmet Horton
L. J. Wilkin
Inventor.
George Wilkin
Per E. Horton, Attorney

UNITED STATES PATENT OFFICE.

GEORGE WILKIN, OF DUNDEE, NEW YORK.

BERRY-HARVESTER.

SPECIFICATION forming part of Letters Patent No. 382,745, dated May 15, 1888.

Application filed June 16, 1887. Serial No. 241,539. (No model.)

*To all whom it may concern:*

Be it known that I, GEORGE WILKIN, a citizen of the United States, residing at Dundee, in the county of Yates and State of New York, have invented a new and useful Improvement in Berry-Harvesters, of which the following is a specification.

My invention is especially designed as an improvement upon my pending application, Serial No. 223,002, filed December 30, 1886; and it consists in the peculiar features and combination of parts more fully described hereinafter, and pointed out in the claims.

In the accompanying drawings, Figure 1 represents a side elevation of my device; Fig. 2, a central vertical section of the same, the dotted lines indicating the position of the hoppers in raised adjustment; Fig. 3, a top view; Fig. 4, a bottom view, and Fig. 5 a detail of the paddle.

The reference-letters $a\ a$ represent the sides of the main frame A, having their rearward ends formed into suitable handles and strengthened by connection with the axle $b$, the forward board, $c$, the rearward boards, $d\ e$, and the parting-strip $t$, the whole frame thus united and its contents being supported by the wheels $y\ z$, journaled upon the axle $b$. Fitting closely within the forward portion of the frame A, and pivoted to the side pieces, $a\ a$, thereof by means of pins $g\ h$, one above the other, are the hoppers $i\ j$, which are of like curved form, and provided with a sieve or screen for the purpose of relieving the berries falling into the hoppers of twigs and leaves. In this process of separating foreign matter from the berries it is intended that the sieve or screen forming the bottom of the upper hopper shall be of sufficient opening or mesh to permit the berries to pass through it, but to separate and arrest the larger leaves and matter therefrom, and that the sieve $t$ in the bottom of the lower hopper shall be of finer mesh to retain the berries, but to admit smaller dirt and matter to pass through it, such as will separate from the berries, aided by the constant jar of the machine as it is wheeled about. To the upper forward portion of the hopper is located a hook, $k$, over which a loop, L, arranged in the end of the paddle, may engage for the purpose of raising the hopper on its pivot-pins when desired to empty it of its contents. A further and more constant use of said paddle, that may be made in any suitable way, having the loop L, is in knocking the berries off the bushes into the hoppers of the harvester located below.

It will be seen that the raised adjustment of the hopper $i$, as indicated by dotted lines in Fig. 2, brings its bottom in line with the parting-strip $t$ of the frame and allows its contents to fall through the opening then made between the board $d$ and the strip $t$ to the ground beneath. In a similar manner the berries may be emptied from the lower hopper, $j$, into a box or receptacle. The pieces $m\ n$, (shown by dotted lines Fig. 3,) secured at an angle across the corners of the open or pivoted end of said hopper $j$, serve the purpose of better confining and guiding the berries into such box or receptacle.

Legs $o$ are pivoted to the sides $a\ a$ of the frame upon pivot-pins $h$ of the hopper $j$, suitably projecting through the frame for the purpose. Side flanges, $o^2\ p$, are secured to the upper edges of the side pieces, $a\ a$, and the front cross-board, $c$, in such inclining manner as to guide the falling berries into the hopper.

As in my other gatherer, before referred to, it is evident that numerous slight changes might be resorted to in the construction of the parts shown; hence I do not wish to limit myself strictly to the parts herein described, but consider myself entitled to all such variations as come within the spirit and scope of my invention.

Having thus described my invention, what I claim as new, and desire to secure by Letters Patent, is—

1. In a berry-harvester, a suitable frame mounted upon wheels in front and provided with handles, in combination with a pair of hoppers located in said frame one above the other, and provided with screen-bottoms, said hoppers having their free ends resting in the forward part of said frame and their rear ends independently hinged or pivoted to the rear part of said frame, whereby the front ends of the hoppers may be independently raised and the hoppers emptied of their contents, substantially as described.

2. In a berry-harvester, the combination of a suitable frame provided with handles and mounted upon wheels in front, a pair of hoppers provided with screen-bottoms and hinged at their rear ends one above the other in said frame, so that their free ends can open upward, guiding-strips $m$ $n$, located in one of said hoppers, and a parting-strip located at the hinged ends of said hoppers, for the purpose as described.

GEORGE WILKIN.

Witnesses:
EMMET HORTON,
L. J. WILKIN.